Dec. 28, 1943.     C. L. BRACKETT     2,337,797
FORMING TOOL
Original Filed Sept. 16, 1938

Inventor
Clare L. Brackett
By E. F. Salter
Attorney

Patented Dec. 28, 1943

2,337,797

UNITED STATES PATENT OFFICE 2,337,797

FORMING TOOL

Clare L. Brackett, Detroit, Mich.

Original application September 16, 1938, Serial No. 230,329. Divided and this application July 20, 1942, Serial No. 451,618

9 Claims. (Cl. 10—85)

The present invention relates to tools and more particularly to forming tools for use in the making of nuts of the self-binding type.

An important object of the present invention is the provision of a tool of this character which will distort a nut to produce a nut having self-binding characteristics.

Another object of the invention is to provide a tool of this character which will distort the nut to a precise, predetermined shape in a single operation.

Other objects and advantages of the invention will be apparent during the course of the following description.

This application is a division of my co-pending application, Serial No. 230,329, filed September 16, 1938, for Self-binding nuts.

In the accompanying drawing which forms a part of this specification and wherein like characters of reference denote like parts throughout:

Figure 1:
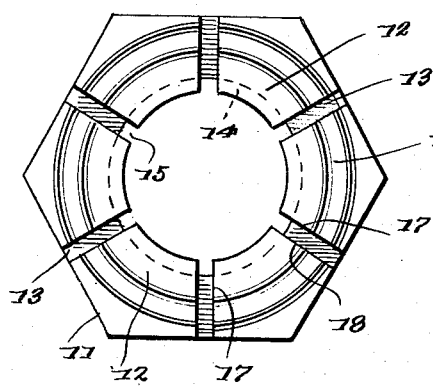
Figure 1 is a top plan view of a nut prior to distortion of the gripping members.

A nut made in accordance with my invention comprises a body 11, here shown as a hexagonal nut body, having the usual axial bore extending therethrough from its top to its bottom face and provided on its top face with an annular series of axially parallel spaced gripping members 12 integral with the nut body and surrounding the bore. A convenient manner of forming the gripping members is by providing a reduced axial extension on the top face of the nut as a frusto-conical portion having its periphery concentric with the nut axis, and then radially slotting the extension at a plurality of spaced points in an axial direction from the outer end of the extension into the top face portion of the nut body. As shown in Figure 1, the resulting structure disposes of the gripping members 12 as an annular series of arcuate fingers spaced apart by the radial slots 13. Preferably the slots lead from the center of each side face of the nut and are of appreciable width, although they may be otherwise arranged.

In producing the nut, the blank with its integral reduced frusto-conical axial extension is bored and slotted and the entire axial extent of the resulting bore is thread tapped. As best shown in Figure 1, this results in providing the fingers 12 with arcuate inner faces 14 threaded in continuation of the nut bore threads 15 and at the same helix angle; the curvature of the inner faces 14 of the fingers being in the radius of the nut bore.

The fingers are of equal length and curvature, their outer faces 16 being arcuately parallel to their inner faces and convergent with respect to the axis of the nut. Thus, each finger is of the same depth or thickness from its leading edge 17 to its trailing edge 18 at any point between its base and its top edge 19 in a plane passed transversely therethrough perpendicular to its inner face.

Figure 2:
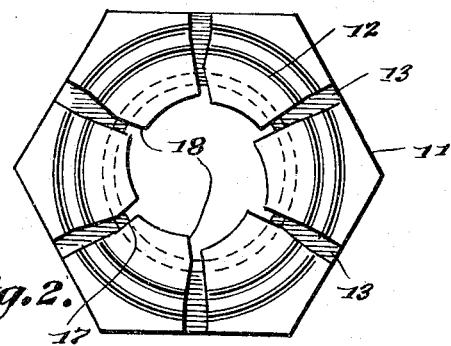
Figure 2 is a top plan view of the nut after the gripping members have been distorted by the tool of this invention.

Following the initial formation of the nut as shown in Figure 1, in which the thread line parallels the nut axis throughout the nut bore and the entire longitudinal extent of the inner face of each finger 12, the fingers are distorted into the positions shown in Figure 2. This is accomplished by bending the fingers radially inward in convergent relation to the axis of the nut, with however, a greater degree of bend at their trailing edges than at their leading edges.

Figure 3:
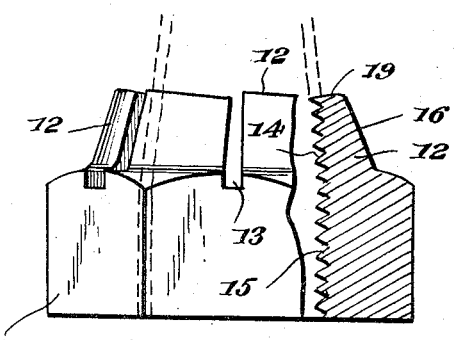
Figure 3 is an elevation, partly in section, of the nut shown in Figure 2.

As shown in Figure 3, this bending operation disposes the inner threaded faces 14 of the fingers at an incline upwardly and inwardly convergent to the axis of the nut from their bases to their top edges 19. The degree of inward bend is progressively increased from each leading edge 17 to each trailing edge 18, as a result of which the angle of inclination is progressively increased uniformly from the leading to the trailing edge. Accordingly, the entire area of the inner face of each finger is brought inside the thread circle of the nut bore and with the trailing top edge at a lesser radial distance from the axis of the nut than the leading top edge, both edges, however, lying within the thread circle.

Due to the fact that the arcs of the inner faces of the fingers are in the radius of the nut bore, the faces 14 will be eccentric to the bore at all points above their bases, and increasingly eccentric from a point just above their base lines to their top edges.

The nut illustrated in Figures 1, 2, 3 and 6 is disclosed in detail in my application referred to above, and need not be further described here.

Figure 4:
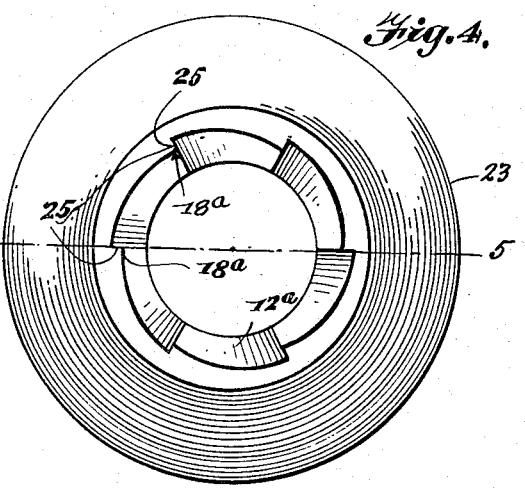
Figure 4 is an end view of the forming tool.

The distortion of the nut fingers is preferably accomplished by pressure application thereover of a forming tool having a plurality of pressure faces corresponding in number, angle and shape with the gripping fingers when in their deformed shape. As best illustrated in Figures 4 to 6, the tool comprises a cylindrical punch 23 having an axial socket or bore 24 in its work engaging end opening to an inwardly tapered countersunk recess formed in the work engaging end of the punch.

The annular wall of the recess is formed with a plurality of arcuate faces 12a corresponding in number and location to the nut fingers 12 and curved in the radius of the outer faces 16 thereof. These faces 12a are eccentric with respect to the punch bore 24, and decreasingly so from their outer to their inner ends axially of the punch, with their inner ends merging into the bore 24. Each face is inclined upwardly and inwardly from its outer end in convergent relation to the punch axis and the angle of inclination is progressively increased from one side edge to the other, resulting in an annular series of shoulders 18a having edge faces 25 extending radially and at diametrically opposed points; the opposed pairs of such edge faces lying at all points in a common diametrical plane extending axially of the punch.

The faces 12a are of equal angle, shape, curvature and area, and the corner edges of the shoulders 18a are at all points from their outer to their inner ends at a lesser radial distance from the axis of the punch bore 24 than are corresponding points along the other side edges of the faces, and increasingly so from their inner to their outer ends.

Figure 5:
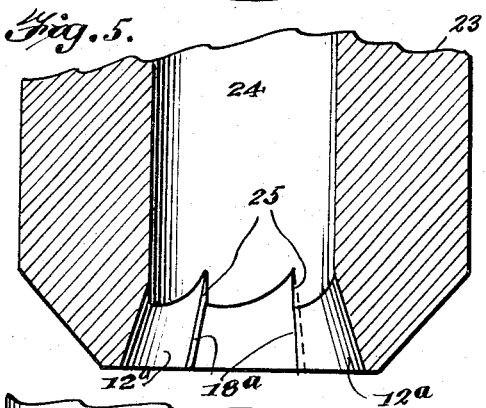
Figure 5 is an axial sectional view taken on line 5—5 of Figure 4.
Figure 6:
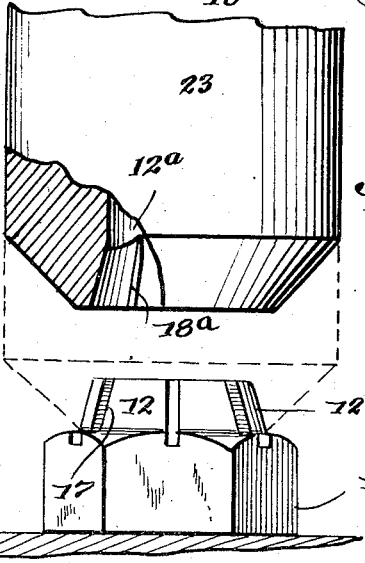
Figure 6 is an elevation, partly in section, illustrating the manner of applying the forming tool, it being shown in dotted lines as fully applied over the nut fingers.

As shown best in Figure 5, the shoulder faces 25 have their sides tapered upwardly and inwardly of the punch at slightly different angles so that they are convergent at a point substantially coincident with the periphery of the bore 24 at a diametrically opposite and inward point thereon. By virtue of this arrangement each shoulder face 25 is of an appreciable width from its outer to its inner end with, however, a slightly greater width at its outer end.

In the operation of deforming the nut fingers the punch is forced down axially over the nut fingers, as indicated in Figure 6, whereupon the fingers will be given their peculiar deformation as previously described. It should here be pointed out that the angle of inclination of the punch faces 12a is greater than the angle of inclination of the outer faces of the nut fingers, and as the major inclination occurs at the shoulders 18a the nut fingers will be given a corresponding bend in forming their trailing edge portions 18.

An important feature of the tool 23 lies in the provision of the shoulder faces 25 which provide centering abutments entering the nut slots 13 when the tool is moved into pressure engagement with a nut and backing up the leading edges 17 of the nut fingers so that they cannot be twisted or be forced to move radially outward with respect to the thread circle of the nut. As the faces 25 provide radial plane surfaces against which the leading flat edges 17 of the nut fingers abut, and further, as no relative rotation takes place between the nut and tool in the forming operation, the leading edges of the nut fingers will remain in substantially radial planes and each finger will be, in effect, bent circumferentially on a longitudinal axis at its leading edge.

While Figure 6 illustrates the forming tool as being moved axially into engagement over a nut fixed on a suitable support, it is evident that if found desirable the nut may be moved relative to the forming tool or to a die having the same formative facing. Either the work as represented by the nut or the tool as represented by the punch may be reciprocated axially with respect to the other.

Nuts constructed in accordance with this invention, when applied over and threaded home on bolt stems and the like, are effectively thread locked thereon with a firm self-binding action under resilient tension of a plurality of gripping members arranged in a manner to brake the nut against retrograde movement of either the nut or the stem to which it is applied.

It will be seen that the tool of this invention will produce the desired deformation of the locking fingers 12 in a single movement of the tool, and that the fingers 12 can only assume the precise position predetermined by the shape and construction of the operative nut engaging portion of the tool.

Having thus described the invention, what is claimed is:

1. A forming tool for shaping resilient gripping fingers on a self-binding nut, comprising a body having an axial bore opening to its work engaging face, said face being countersunk around the bore, and the surface of said countersunk portion being formed with an annular series of arcuate faces eccentric to the bore.

2. A forming tool for shaping resilient gripping fingers on a self-binding nut, comprising a body having an axial bore opening to its work engaging face, said face being countersunk around the bore, the surface of said countersunk portion being provided with an annular series of arcuate faces eccentric to the bore, and said faces from their outer to their inner ends being inclined axially and radially inwardly of the bore at an angle of inclination progressively increased from one side edge to the other side edge of each.

3. A forming tool for shaping resilient gripping fingers on a self-binding nut, comprising a body having an axial bore opening to its work engaging face, said face being provided with an annular series of arcuate portions axially convergent relative to the bore axis and decreasingly eccentric thereto axially inwardly of the tool.

4. A forming tool for shaping gripping portions of a self-binding nut, comprising a body having its work engaging face provided with a recess, the peripheral surface of said recess being provided with a series of arcuate faces, the center of the arc of each face being spaced from the centers of the arcs of the other faces.

5. A forming tool for shaping gripping portions of a self-binding nut, comprising a body having its work engaging face provided with a recess, the peripheral surface of said recess being provided with a series of arcuate faces, the center of the arc of each face being spaced from the centers of the arcs of the other faces, and said arcuate faces being separated by shoulders extending in a direction radially and substantially axially of the recess.

6. A forming tool for shaping the gripping portions of a self-binding nut, comprising a body having a recess in its work-engaging face, the peripheral surface of said recess being provided with a series of faces, each face being offset at its ends from the adjacent faces to provide shoulders between the faces, each of said shoulders facing in the same direction with respect to the periphery of the recess, and said faces from their outer to their inner ends being inclined axially and radially inwardly of the recess at an angle of inclination progressively increased from one side edge to the other side edge of each face.

7. A forming tool for shaping resilient gripping fingers on a self-binding nut, comprising a body having a recess in its work engaging face to receive the gripping fingers of the nut, said recess having inwardly converging walls, said walls of the recess being provided with a series of axially and radially inclined faces, each face being offset at its ends from the adjacent faces to provide shoulders between the faces, each of said shoulders facing in the same direction with respect to the periphery of the recess and each of said faces being of a size to engage one of the gripping fingers of the nut whereby, when the nut is moved into the recess each finger will be bent inwardly and twisted about one of its ends as an axis while the end of the finger serving as its twisting axis is maintained against outward movement by the corresponding face of the recess.

8. A forming tool for shaping spaced resilient gripping fingers on a self-binding nut, comprising a body having a substantially circular recess in its work engaging face to receive the gripping fingers of the nut, said recess having inwardly converging walls, the walls of the recess being provided with an annular series of arcuate faces eccentric to said recess, each of said faces being of a size to engage one of the gripping fingers of the nut, whereby each finger will be bent inwardly and twisted about one of its ends as an axis when the tool is moved axially of the nut, the end of the finger serving as its twisting axis being maintained against radially outward movement by the corresponding arcuate face.

9. A forming tool for shaping spaced resilient gripping fingers on a self-binding nut, comprising a body having a substantially circular recess in its work engaging face to receive the gripping fingers of the nut, said recess having inwardly converging walls, the walls of the recess being provided with an annular series of arcuate faces eccentric to said recess, each of said faces being of a size to engage one of the gripping fingers of the nut, whereby each finger will be bent inwardly and twisted about one of its ends as an axis when the tool is moved axially of the nut, the end of the finger serving as its twisting axis being maintained against radially outward movement by the corresponding arcuate face, and shoulders separating the arcuate faces and extending substantially axially of the recess, said shoulders being adapted to be received in the spaces between the gripping fingers to prevent relative rotation between the tool and nut.

CLARE L. BRACKETT.